United States Patent

[11] 3,601,962

[72] Inventor Curtis J. Townsend
P. O. Box 374, Port Orange, Fla. 32019
[21] Appl. No. 826,833
[22] Filed May 22, 1969
[45] Patented Aug. 31, 1971

[54] FRUIT HARVESTER WITH OFFSET FRUIT REMOVING DEVICE
6 Claims, 7 Drawing Figs.

[52] U.S. Cl. ................................................. 56/328 R
[51] Int. Cl. .................................................... A01g 19/08
[50] Field of Search ........................................... 56/328, 330

[56] References Cited
UNITED STATES PATENTS
1,077,640  11/1913  Randall ........................ 56/328

| | | | |
|---|---|---|---|
| 3,040,507 | 6/1962 | Lasswell, Jr. .................. | 56/328 |
| 3,380,235 | 4/1968 | Smith et al. .................... | 56/328 |
| 3,396,521 | 8/1968 | McKibben et al. ............. | 56/330 |
| 3,478,501 | 11/1969 | Patzlaff .......................... | 56/330 |
| 3,482,383 | 12/1969 | McKibben ....................... | 56/330 |

Primary Examiner—Russell R. Kinsey
Attorneys—Clarence A. O'Brien and Harvey B. Jacobson ABSTRACT: An attachment for a fruit harvester incorporating a plurality of rotary elements oriented in substantially vertical alignment with each rotary element including an offset beater in the form of a bar or tine which orbits about a rotational axis in a manner to engage fruit adjacent its connection with the stem for dislodging the fruit from the stem and causing the dislodged fruit to move in an outward trajectory in relation to the canopy of the tree toward the fruit harvester which serves as a device for catching and collecting the fruit.

Curtis J. Townsend
INVENTOR.

Curtis J. Townsend
INVENTOR.

FRUIT HARVESTER WITH OFFSET FRUIT REMOVING DEVICE

The present invention generally relates to removal of fruit from a tree and more particularly the removal of citrus fruit such as oranges or the like. A fruit removing device is provided for association with the canopy of a fruit tree which includes an assembly of a plurality of elongated beaters which rotate or orbit about an axis spaced from the longitudinal axis of the beater for engagement with the fruit or stem adjacent the point of connection between the fruit and stem for dislodging the fruit from the stem and causing the fruit to move in an outward trajectory in relation to the canopy of the tree toward a device for catching the fruit which may be in the form of an existent fruit harvesting device.

Many attempts have been made to harvest fruit from trees including the fruit harvester disclosed in copending application Ser. No. 488,094 now U.S. Pat. No. 3,447,293, filed Sept. 16, 1965 by Ray F. Townsend. While the device disclosed in that application performs satisfactorily especially in hedge row plantings of orange trees, in some instances, such as in check row planting of orange trees, time is consumed in positioning the fruit harvester in appropriate relation to each tree and maneuvering the fruit harvester around the periphery of the tree. The present invention has for its primary object, the provision of an attachment for the fruit harvester with the attachment incorporating a plurality of vertically aligned rotatable offset beaters in the form of an elongated bar or tine which rotate or orbit about an axis spaced from the longitudinal axis of the beater or tine with all of these offset beaters or tines being oriented in an angular direction so that the fruit harvester may be driven in a relatively straight line and substantially all of the fruit removed from one segment of the canopy of the tree during the single straight line pass of the fruit harvester with the attachment of the present invention mounted thereon.

By employing the attachment of the present invention, check row planted orange trees of the like may be effectively picked by four straight line passes of the harvester and attachment. Thus, the harvester with the attachment of the present invention added thereto may proceed down a row of trees in a straight line, and subsequently proceed in three other straight line passes inasmuch as the trees are check row planted that is, in rows in perpendicular directions. The present invention also incorporates a structure to enable the relative position between the attachment and the tree to be varied both as to radial position and angular relationship between the rotating offset beaters and the canopy of the tree.

A further object of the present invention is to provide a device for removing fruit from trees which is relatively simple in construction, effective for removing fruit in a rapid and efficient manner and incorporating substantially conventional structural components for retaining the cost as low as possible and rendering the device economically feasible.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIG. 1 is a top plan view of the attachment of the present invention connected with an existing fruit harvester and illustrating the association of the attachment with the canopy of a citrus fruit tree or the like.

Figure 1:
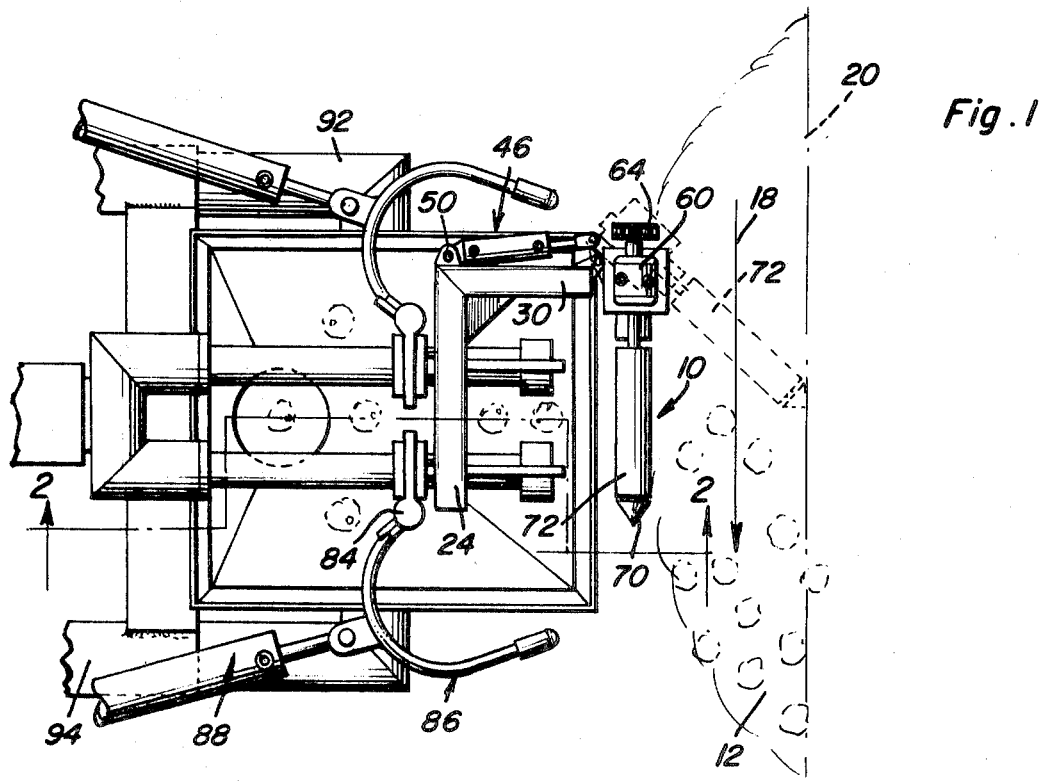
Figure 2:
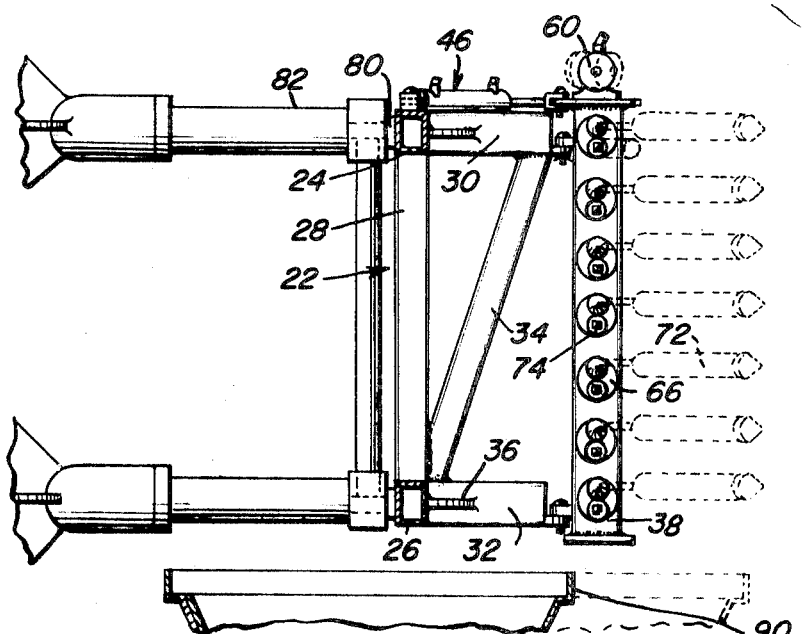
FIG. 2 is a vertical sectional view taken substantially upon a plane passing along section line 2—2 of FIG. 1 illustrating further structural details of the attachment.
Figure 7:
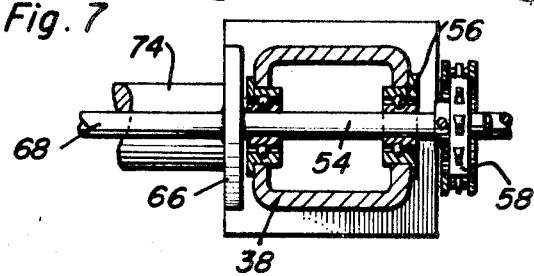
FIG. 7 is a detailed sectional view, on an enlarged scale, taken substantially upon a plane passing along section line 7—7 of FIG. 3 illustrating further structural details of the attachment.

Referring now specifically to the drawings, the fruit removing attachment of the present invention is generally designated by the numeral 10 and is illustrated in combination with the fruit harvester disclosed in the aforementioned patent. The details of the fruit harvester have not been illustrated except in order to show the relationship between the attachment and the fruit harvester with it being understood that the fruit harvester includes a suitable tractor-type vehicle and an elevating mechanism for elevating the fruit harvester to a desired elevation together with means for laterally extending the fruit harvester to position the fruit harvester in desired relationship to the row of fruit trees. The canopy of the fruit tree is designated by the numeral 12 and the present invention is primarily intended for harvesting citrus fruits such as oranges 14 supported from the tree by the usual stem 16 with the fruit 14 normally depending from the stem. In check row planted trees, the fruit harvester will be propelled or driven alongside of the row of trees so that the attachment will effectively remove fruit 14 from an outer segment of the canopy 12 of the fruit tree as illustrated in FIG. 1. In FIG. 1, the arrow 18 designates the direction of travel and the broken line 20 indicates the straight line path of the end of the attachment which extends into the canopy 12 of the tree. The vertical extent of the attachment is such that upon one pass of the harvester with the attachment 10 thereon, all or substantially all of the fruit will be removed from that portion of the canopy of the tree outwardly of the vertical plane delineated by broken line 20 in FIG. 1.

The attachment 10 includes a vertically disposed frame 22 including substantially horizontally disposed upper and lower beams 24 and 26 interconnected by a vertical beam 28. One end of each beam 24 and 26 is provided with a forwardly projecting beam 30 and 32. A diagonal vertical brace 34 extends from the outer end of the upper beam 30 to the lower end of the vertical beam 28 and gusset plates 36 are provided in the juncture between the horizontal beams 24 and 26 and the forwardly extending horizontal beams 30 and 32 thus forming a substantially rigid L-shaped frame as illustrated in FIG. 1 with it being pointed out that the specific construction and dimension of the frame may be varied.

At the outer end of each forwardly extending horizontal beam 30 and 32, there is provided a projecting mounting lug 37 which pivotally supports a vertical or upright mounting beam 38. The mounting beam 38 has a pair of projecting lugs 40 thereon which align with and engage the upper surface of the lugs 37 with pivot pins or fasteners 42 extending therethrough to pivotally support the mounting beam 38 for pivoting movement about a vertical axis generally defined by fasteners 42. For pivoting the mounting beam 38, the upper end thereof is provided with an offset lug 44 having one end of a piston and cylinder assembly 46 connected thereto by a removable fastener element 48. The other end of the piston and cylinder assembly 46 is pivotally attached to a mounting lug 50 carried by the inner end of the upper beam 30 or the upper end of the supporting frame 28 so that by extension and contraction of the piston and cylinder assembly 46, the vertical or upright hollow supporting beam 38 may be pivoted about an axis defined by the fasteners 42. The piston and cylinder assembly 46 is a double-acting piston and cylinder assembly preferably hydraulically actuated and connected with the usual hydraulic system on the tractor-type vehicle associated with the harvester.

Figure 3:
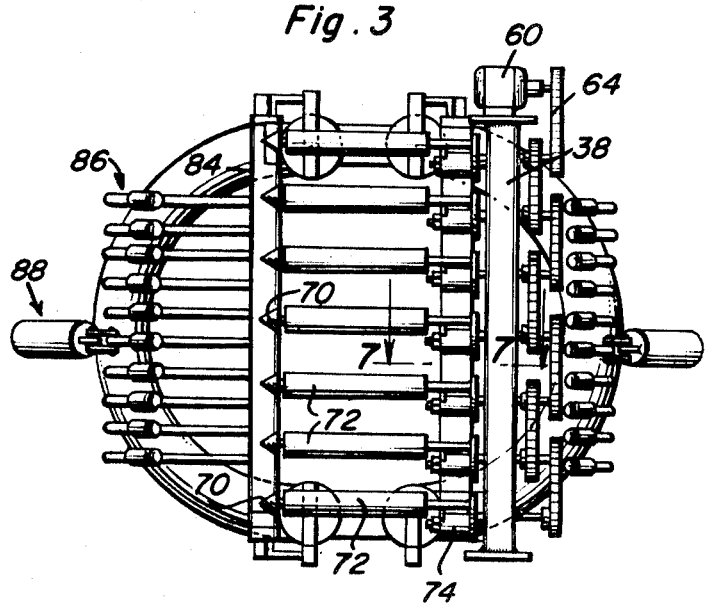
FIG. 3 is a front elevational view of the attachment showing its association with the fruit harvester.
Figure 4:
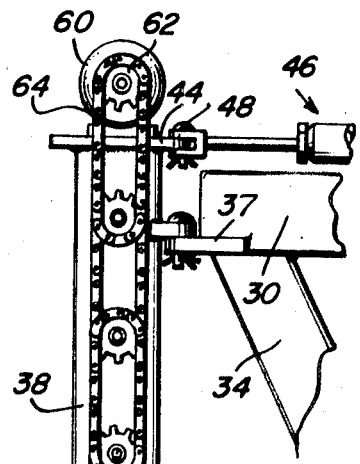
FIG. 4 is an enlarged detailed elevational view of the drive end of the attachment.
Figure 5:
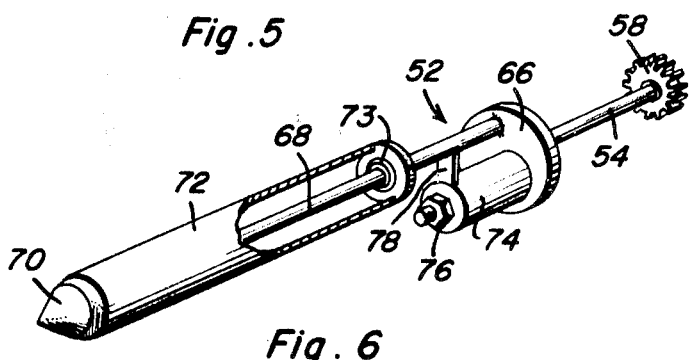
FIG. 5 is an enlarged perspective view of one of the offset beaters with portions thereof broken away illustrating the structural details thereof.

Mounted on the vertical support beam 38 is a plurality of fruit engaging and removing elements or assemblies each generally being designated by numeral 52 with the details thereof illustrated in FIG. 5. Each assembly 52 includes a shaft 54 which extends horizontally through the hollow mounting beam 38 and is journaled in suitable bearings 56 in the opposed walls thereof. The bearings 56 may be conventional ball bearings, roller bearings, bushings or the like and provided with any suitable lubrication means including a sealed lubricated assembly if desired. One end of the shaft 54 is provided with a chain receiving sprocket gear 58 or two sprocket gears in some instances inasmuch as all of the shafts 54 are driven by a single motor 60 mounted on top of the mounting beam 38 and provided with an output sprocket gear 62 thereon which drives a sprocket chain 64. As illustrated in FIGS. 3 and 4, all of the shafts 54 except for the bottommost shaft has two sprocket gears thereon so that the shafts 54 are driven in a series relationship. Various drive arrangements may be provided including sprocket chains, roller chains, gear arrangements or any other arrangement for imparting rotary motion to the shaft 54 with the shaft 54 being rotatable at the same speed or any suitable variable speed so that all of the fruit removing assemblies 52 are operative in varying portions of their cycles at any given time.

Figure 6:
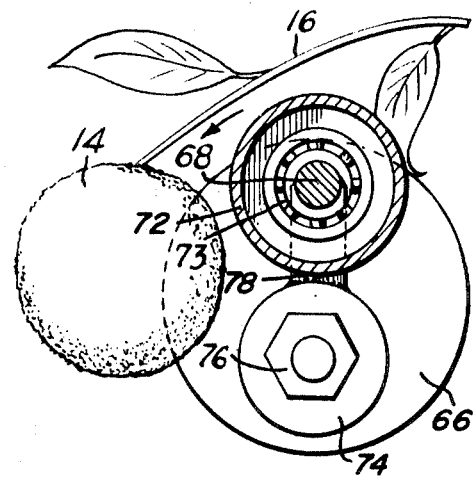
FIG. 6 is an enlarged fragmental view illustrating the association of the offset beater with the fruit and stem illustrating the manner in which the fruit is disconnected from the stem.

The other end of the shaft is provided with a plate 66 which may be circular, rectangular or any other suitable shape. Mounted eccentrically of the center of the plate 66 and eccentrically of the rotational axis of the shaft 54 is an elongated rod or bar 68 which is parallel with the shaft 54 but offset therefrom. The inner end of the rod or bar 68 is rigidly fixed to the plate 66 and the outer end thereof is provided with a substantially conical tip end 70 which has an outside base diameter substantially equal to the periphery of a hollow drum or roller 72 that is freely rotatably journaled on the rod or bar 68 with suitable bearing means 73 provided therefor. Thus, as the shaft 54 is rotated, the plate 66 will be rotated thus causing the bar 68 and the freely rotatable roller 72 thereon to orbit in a path spaced from the center of rotation of the shaft 54 as best illustrated in FIG. 6 with the movement of the roller 72 during some period of its rotation becoming oriented in the position illustrated in FIG. 6 so that the impact or force exerted on the fruit 14 will be from a direction generally along the stem 16 in a generally outward and downward manner so that the fruit 14 will be disconnected from the stem 16 and given a trajectory of movement in an outward direction so that the fruit will be discharged outwardly from the canopy of the tree.

Also mounted on the plate 66 in eccentric relation to the center thereof and diametrically opposed to the rod 68 is a counterweight 74 secured in place by a removable bolt 76 or other locking means which enables the counterweight to be removed and replaced with a counterweight of different weight if desired. Fixed to the counterweight 74 is a shield member 78 which projects toward and engages the periphery of the rod or bar 68 to prevent fruit tree limbs, stems or twigs from entering the space between the bar 68 and the counterweight 74 and becoming wound on the rotating assembly 52. Any suitable structure may be provided for filling the area between the counterweight and the bar 68 to eliminate the possibility of damage to the fruit tree by winding limbs or stems on the rotating assembly 52.

The frame 22 is supported from suitable connecting bracket structures 80 attached to the outer ends of support members 82 which also include pivotal support bracket structures 84 for a pair of rake tine assemblies generally designated by the numeral 86 which correspond with the rake tines 118 in the aforementioned patent. When the attachment 10 of the present invention is mounted on the harvester, the tine assemblies 86 are retained in their open position as illustrated in FIG. 1 by piston and cylinder assemblies 88 so that the tine assemblies 86 serve as a catch device for the citrus fruit removed by the attachment 10. Underlying the catch device is a collecting tray 90 which catches the fruit which is thrown against the tine assemblies and drops downwardly. Inasmuch as the rake tines are held in their open inoperative positions, the tines provide an effective catching device for depositing the fruit in a suitable collecting device which may be carried on the harvester in underlying relation to the rake tines.

The catching chute or tray 90 is movably supported by rigid members 92 slidable in guides 94 under the assemblies 86 which enables the harvester to be laterally adjusted to the optimum relation to a tray. The tractor-type vehicle includes lift elements generally in the form of a forklift truck supporting a framework which reciprocally supports the supporting members for the tray and the tine assemblies as well as the attachment 10. This enables the attachment 10 to be moved toward the tree and the piston and cylinder assembly 46 is actuated to orient the rotating beaters or assemblies 52 into an acute angular relation to the path of movement of the vehicle. The hydraulic motor 60 is then actuated to cause the offset bars 68 and rollers 72 thereon to orbit or move in an arcuate path so that the downward movement of the roller 72 will be in an outward path as illustrated in FIG. 6. The speed of rotation of the offset assemblies 52 may be varied by varying the speed of the hydraulic motor from a suitable control valve incorporated into the hydraulic system of the tractor-type vehicle.

The fruit harvesting attachment or mechanism basically incorporates a rotating bar, such as a freely rotatable roller, mounted offcenter to a driven shaft or to counterbalance weight to compensate for the weight of the offset rotating bar. The weights may be interchanged to compensate for different lengths of rotating bar or roller and any coating which may be placed on the bar or roller, such as a coating of resilient material or the like. The drive shafts are journaled in a column or vertical frame member with various types of drives being employed as required or desired with the invention also contemplating the adjustment of the centers of the rotating bars or rollers. The angular control of the mounting column for the rotating bars or rollers enables control of the angle of the rotating bars with relation to the foliage of the tree and direction of movement of the carrier vehicle. Various types of drive means may be employed for the driven shaft such as chain and sprocket arrangements, gear and pinion arrangements, belt and pulley arrangements, fluid motors, electric motors, combustion engines or the like. The mounting means may be varied for adapting the device to use with various fruit harvesters or the like. Of course, the harvesting mechanism may be incorporated into a structure including a catching device of a construction specifically adapted for use with the rotating bar or roller assembly.

The rotating bars or rollers as they are moved through the foliage of the tree will engage fruit suspended by the stems due to the stems being forced through the spaces between the shaft centers. At some point of the movement of the stem suspended fruit through the rotating bars, a force will be exerted on the stem fruit connection so that the fruit is separated from the stem. The force exerted on the connection between the stem and fruit may be a rotational or twisting force such as exerted by the roller or a circumlinear force exerted by the bar in the event the roller is not employed. Fruit separated from the stems falls into or is projected into the catching device such as the rake tine assemblies disclosed in the aforementioned patent and as the carrier vehicle moves parallel to the row of check planted trees, fruit removal is a continuous process.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

I claim:

1. A fruit harvesting mechanism comprising an elongated member adapted to be inserted into the foliage of a fruit tree, means supporting said member for rotation about an axis spaced from and generally parallel to the longitudinal axis of the member for moving the member in a circular path, said support means including a plate member having first and second sides and being attached to said elongated member at a point spaced from its center on the first side, a drive shaft rigidly affixed to said plate at its center on the second side, and means driving said drive shaft for moving said member in a circular path to engage the fruit of the fruit tree adjacent the connection of the fruit with the stem for disconnecting the fruit from the stem.

2. The structure as defined in claim 1 together with counterweight means attached to said plate to counteract unbalanced forces during rotation of the elongated member.

3. The structure as defined in claim 1 together with a roller freely journaled on said elongated member for engaging the fruit.

4. The structure as defined in claim 2 wherein said counterweight means includes an offset weight, and removable locking means for removing and locking the weight in position.

5. The structure as defined in claim 4 together with shield means between said elongated member and said counterweight means for preventing entanglement of the foliage with the elongated member and counterweight means.

6. The structure as defined in claim 1 together with a plurality of additional elongated members oriented in substantially vertical alignment and being of substantially identical construction, and means rotating all of said elongated members in the same direction, and means supporting all of said elongated members for angular displacement about a vertical axis to enable the elongated members to project outwardly for passing through the canopy of a citrus fruit tree in a linear direction and being disposed in acute angular relation to a radius of the tree perpendicular to the path of linear movement, said drive means driving said elongated members causing rotation thereof in a direction to provide an outward trajectory to citrus fruit harvested from the tree.